Nov. 1, 1960          R. W. HILL          2,958,217
SYSTEM FOR TRANSFERRING CUSTODY OF CRUDE OIL AND THE LIKE
Filed Jan. 10, 1958          2 Sheets-Sheet 1

INVENTOR.
RALPH W. HILL
BY
*Jerry J Dunlap*
ATTORNEY

United States Patent Office 2,958,217
Patented Nov. 1, 1960

2,958,217

SYSTEM FOR TRANSFERRING CUSTODY OF CRUDE OIL AND THE LIKE

Ralph W. Hill, Tulsa, Okla., assignor to Major Engineering Company, Tulsa, Okla., a corporation of Oklahoma Filed Jan. 10, 1958, Ser. No. 708,275

2 Claims. (Cl. 73—3)

This invention relates to an improved system for transferring custody of crude oil and the like, and more particularly, to such a system utilizing a meter wherein the meter may be periodically tested or proved in its operating position and without the use of separate apparatus.

As it is well known in the oil industry, a meter is frequently used to measure the amount of crude oil supplied from an oil producer to a pipe line company. Such meters are ordinarily used in conjunction with a surge tank upstream of the meter in order that the meter will have a constant supply of oil and the meter may be operated for a short number of hours out of each day, with the oil produced in the intervening periods being stored in the surge tank. Such systems ordinarily provide accurate information as to the amount of oil transferred. However, the meters sometimes develop inaccuracies which are not obvious enough to be detected by the meter reader, but produced substantial errors in the measurement of the volume of oil transferred if the meters are continued in operation over any substantial length of time. At the present time it is a general practice to periodically test or prove the meters by use of a separate calibrated prover tank. Either the calibrated prover tank is transported to the meter location, or vice-versa, and a special hook-up made to run a pre-determined volume of oil through the meter and compare the reading of the meter with the oil supplied or removed from the calibrated prover tank.

The present invention contemplates a novel system for transferring the custody of crude oil or the like, wherein the meter may be proved in situ, and without the necessity of transporting a special prover tank to the meter location. I contemplate the use of a flume mounted on the surge tank and equipped with vertically spaced floats. The floats are in turn operatively connected to a control valve in the supply line to the surge tank and the pump used for pumping oil from the surge tank through the meter, such that the surge tank may be used in the normal fashion to merely hold an adequate supply of oil for the meter, or the surge tank and flume may be used as a prover tank for the meter. I also contemplate the use of visual gauging means on the flume, whereby the level of oil in the tank and flume can be precisely determined prior to a test run and after a test run to accurately determine the volume of oil pumped from the surge tank and flume. This determination, along with the actual temperature of the oil, may be used to precisely determine the accuracy of the meter.

An important object of this invention is to economically convert an existing meter system for transferring the custody of crude oil and the like to such a system wherein the meter used in measuring the volume of oil transferred may be periodically proven in situ and without the necessity of transporting a separate prover tank to the meter location.

Another object of this invention is to accurately and economically test a meter used in measuring the amount of crude oil transferred from a producer to a pipe line company.

A further object of this invention is to provide a normal transfer of oil from a producer to a pipe line company through a meter, and periodically prove the meter, with the normal operating personnel, and without the use of distantly located apparatus.

A still further object of this invention is to provide a simply constructed meter type of system for transferring the custody of crude oil and the like which may be used to also prove the meter, which system will have a long service life and may be economically manufactured.

Other objects and advantages of the invention will be evident from the following detailed description, when read in conjunction with the accompanying drawings which illustrate my invention.

Figure 1:
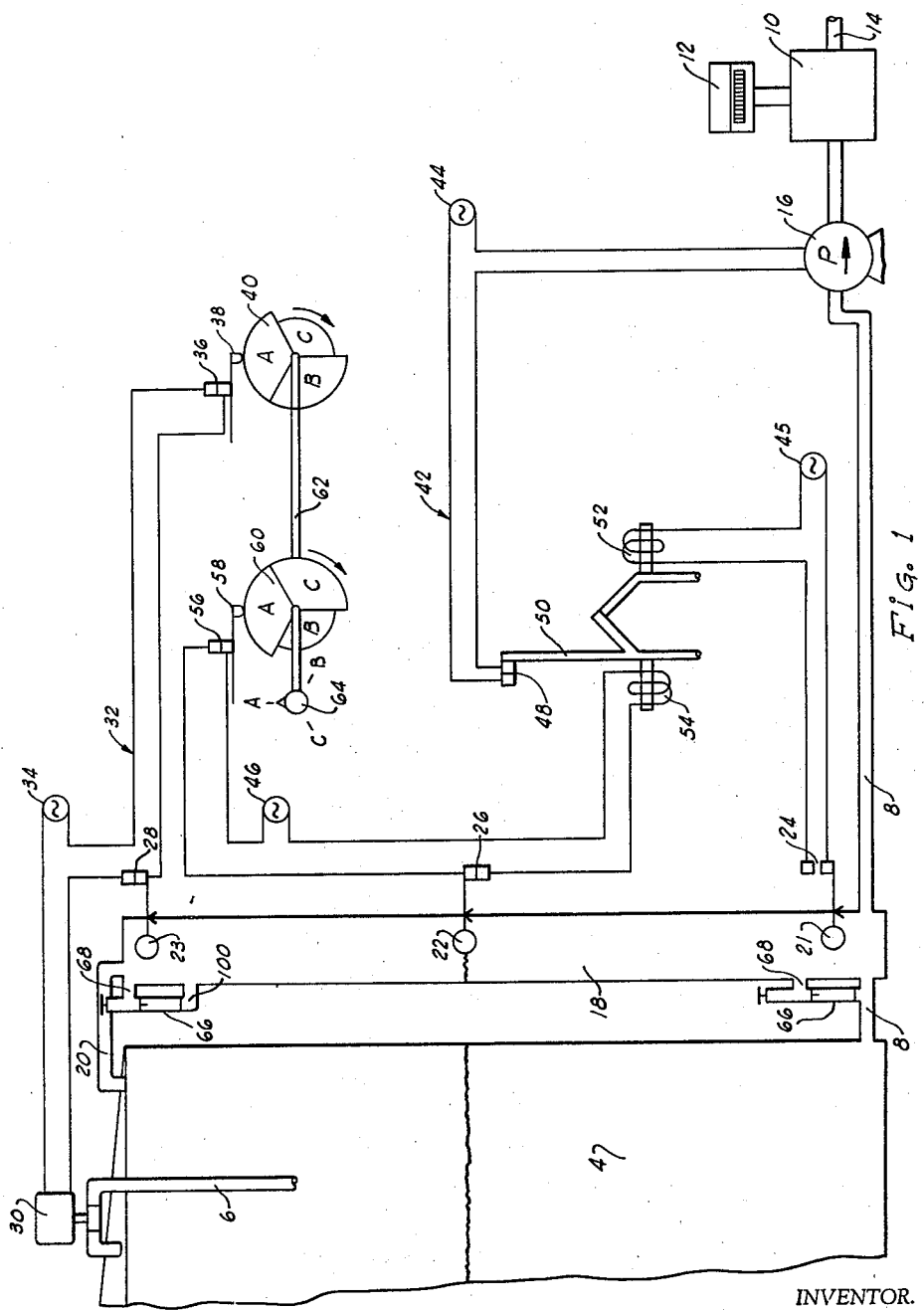
Figure 1 is a schematic elevational view of a meter type system for transferring custody of crude oil and the like constructed in accordance with the invention, including a schematic wiring diagram for control of the system.

Referring to the drawings in detail, and particularly Fig. 1, reference character 4 designates a surge tank having a supply line 6 communicating with the top thereof and a discharge line 8 extending from the lower portion thereof. The discharge line 8 is connected to a suitable positive displacement meter 10, preferably having a ticket printer 12 thereon for providing a printed record of the amount of oil flowing through the meter 10. The meter 10 is ordinarily of the temperature-compensated type, whereby the volume of oil registered by the meter is automatically corrected to a base temperature, such as 60 degrees F. Any other desired equipment, such as a gas eliminator, strainer, sampler and BS and W monitor (not shown) may be connected with the meter in the usual fashion to determine the quality of the oil being transferred from the surge tank 4 to a producing pipe line 14 connected to the outlet of the meter 10. An electrically driven pump 16 is interposed in the line 8 between the outlet of the surge tank 4 and the inlet of the meter 10 to pump the crude oil from the surge tank and through the meter to the receiving pipe line. Also, a suitable back pressure valve (not shown) is interposed in the line 8 downstream of the pump 16 to prevent flow through the line 8 when the pump 16 is stopped.

In accordance with the present invention, a hollow flume 18 is mounted on the surge tank 4 and is preferably of substantially the same height as the surge tank. The upper end of the flume 18 is connected to the upper end of the surge tank 4 by a gas equalizing line 20, and the lower end portion of the flume 18 is connected to the lower portion of the tank 4 either by interposing the lower end of the flume 18 in the discharge line 8, or connecting the lower end of the flume to the lower end of the tank 4 by a separate conduit. It will therefore be apparent that the flume 18 is connected in parallel with the surge tank 4 and oil will flow from the surge tank 4 through the discharge line 8 into the flume 18, such that the oil level in the tank 4 and the flume 18 will be the same at all times. Three vertically spaced floats 21 through 23 are pivotally supported in the flume 18 in such a manner that the arms of the floats protrude through the side of the flume. However, the precise construction of the floats 21 through 23 is immaterial and the float assemblies may be of any conventional construction. The lower float 21 carries the movable contact of a switch 24, and the float 21 is preferably supported in the lower end portion of the flume 18 a short distance above the discharge line 8. The central float 22 is positioned in the medial portion of the flume 18 and carries the movable contact of a switch 26. The upper float 23 is positioned adjacent the top of the flume 18 and carries the movable contact of still another switch 28. The switch 26 opens upon downward movement of the float 22; whereas the switches 24 and 28 close upon downward movement of their respective floats, for purposes as will be hereinafter set forth.

An electrically operated control valve 30 is interposed in the supply line 6 to control the supply of oil to the surge tank 4, as will be more fully hereinafter set forth. The valve 30 is connected to the upper float switch 28 by a first electrical circuit, generally designated by reference character 32. The circuit 32 comprises a suitable power source 34 connected in series with the valve 30 and the switch 28. Another switch 36 is interposed in the circuit 32 between the power source 34 and the switch 28. The movable contact of the switch 36 is supported on a spring-loaded arm 38, and the arm 38 in turn rides on a cam 40. Substantially two-thirds of the cam 40 has the same radius, and the remaining one-third has a smaller radius, to close and open, respectively, the switch 36, as will be more fully hereinafter set forth.

The lower float switches 24 and 26 are connected to the pump 16 by a second electric circuit generally designated by reference character 42. The circuit 42 includes three power sources, 44, 45 and 46. The power source 44 is connected in series with the pump 16 and the contacts 48 of a double acting relay 50. One coil 52 of the relay 50 is connected in series with the power source 45 and the lower float switch 24. The opposite coil 54 of the relay 50 is connected in series with the central float switch 26, the power source 46 and another switch 56. The movable contact of the switch 56 is carried by a spring-loaded arm 58 which bears on another cam member 60. The cam 60 is constructed in the same manner as the previously described cam 40, but is turned with respect to the cam 40, as will be more fully hereinafter set forth. Both of the cams 40 and 60 are mounted on a common shaft 62 and are turned in unison by a control knob 64 mounted on one end of the shaft 62. The control knob 64 has three operating positions, designated by A, B and C, to properly energize the circuits 32 and 42. For purposes of explanation, the cams 40 and 60 have also been divided into three sections to correspond with the operating positions of the knob 64. It will be observed that the A sections of the cams are of the larger radius to provide a closing of the switches 36 and 56 when the knob 64 is in the A position. The reduced radius portion of the cam 40 corresponds with the C position of the knob 64 and the reduced radius portion of the cam 60 corresponds to the B position of the knob 64 to provide reversed operations of the switches 36 and 56 when the knob 64 is moved between the C and B positions, as will be more fully hereinafter set forth.

Figure 2:
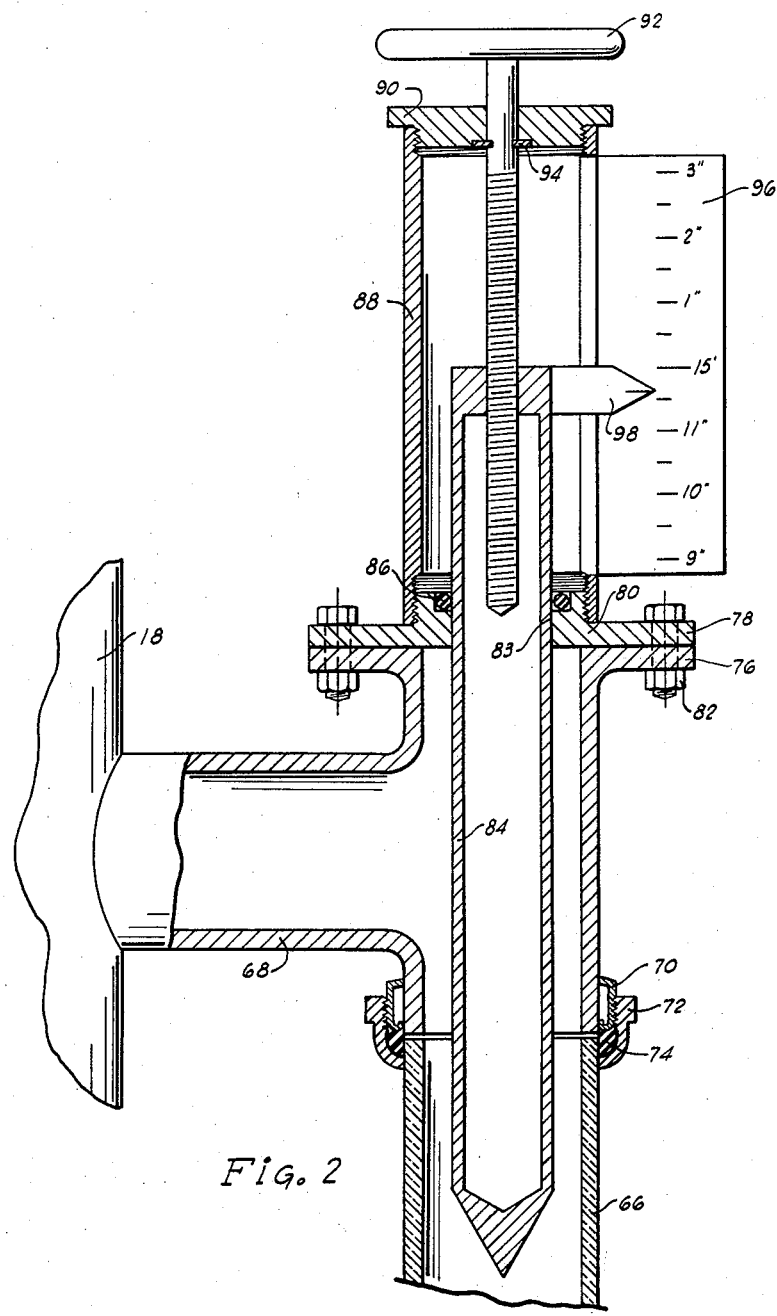
Figure 2 is an enlarged vertical sectional view of a portion of a glass gauge and associated apparatus for precisely determining the level of oil within the glass gauge.

Gauge glasses 66 are mounted on the flume 18 across the lower and upper floats 21 and 23. The upper portion of each gauge glass 66 is connected to the flume 18 by a T-type connector 68, as shown in detail in Fig. 2. The lower end of each T-connector 68 is provided with a circumferential flange 70 having threads on the outer periphery thereof to receive a threaded ring 72. Each ring 72 is of a size to slidingly telescope onto the upper end portion of the respective gauge glass 66 and retain a suitable packing 74 around the outer end of the gauge glass and the lower end of the connector 68 to provide a fluid tight seal of the gauge glass to the connector. It will also be observed that the size of the lower end of the connector 68 substantially corresponds to the size of the gauge glass 66.

The upper end of each connector 68 is provided with a flange 76 to receive the mating flange 78 of a plug 80.

The flanges 76 and 78 are preferably interconnected by a plurality of circumferentially spaced bolts 82, and a suitable seal (not shown) is inserted between the flanges 76 and 78 to provide a fluid tight connection of the plug 80 on the connector 68. A bore 83 extends vertically through the central portion of the plug 80 to slidingly receive a liquid level pointer 84. Also, a suitable packing ring 86 is provided around the pointer 84 in the bore 83 to provide a fluid tight seal of the pointer in the plug 80. The pointer 84 is of a length to extend downwardly through the respective connector 68 and into the gauge glass 66, for purposes which will be hereinafter set forth. A sleeve or tube 88 is threadedly secured to the plug 80 and extends above the connector 68 to receive an apertured cap 90. An adjusting screw 92 is rotatably secured in the cap 90 by a lock ring 94 and extends downwardly through the tube 88 into threaded connection with the upper end of the pointer 84. Thus, rotation of the adjusting screw 92 raises and lowers the pointer 84 through the gauge glass 66. A stationary scale 96 is secured on one side of the sleeve 88, and indicating hand 98 is secured on the upper end of the pointer 84 and extends through a complementary slot in the sleeve 88 to a position over the scale 96. Thus, the position of the pointer 84 is indicated by the hand 98 and scale 96.

The lower end of the upper gauge glass 66 is suitably connected to the flume 18 by a short L-shaped conduit 100 as shown in Fig. 1. The upper connector 68 and conduit 100 are located on the flume 18 such that an oil level in the flume 18 sufficient to actuate the upper float 23 will be indicated in the upper gauge glass 66. The lower end of the lower gauge glass 66 is connected to the discharge line 8 to provide a flow of oil through the lower glass gauge 66 from the flume 18. The location of the lower gauge glass 66 is such to indicate the oil level in the glass when the oil level is of a height in the flume 18 to operate the lower float 21, and particularly when the oil level is being lowered in the flume 18 and is lowered to a point for closing of lower float switch 24.

*Operation*

In the normal operation of the present system, the control knob 64 will be in the A position, such that both of the switches 36 and 56 will be closed. It will also be noted that the upper float switch 28 will be closed to energize the control valve 30. The control valve 30 is preferably of the type to be opened when energized. When oil is supplied through the inlet pipe 6 into the surge tank 4, a portion of the oil will flow through the discharge line 8 into the flume 18 to raise the lower float 21. This movement of the float 21 opens the switch 24, however, opening of the switch 24 does not operate the relay 50. When the level of the oil in the flume 18 reaches a point to raise the central float 22, as shown in the drawing, the central float switch 26 is closed to energize the relay coil 54 and close the relay switch 48. At this time power is supplied to the pump 16 for pumping oil from the surge tank 4 through the meter 10 to the receiving pipe line 14. This operation will continue until the oil level in the surge tank 4 and flume 18 reaches the lower float 21. When this occurs, the lower float 21 is lowered to close the lower float switch 24. Upon this movement, the opposite relay coil 52 is energized to open the relay switch 48 and de-energize the pump 16. Thus, the pump 16 will be operated to pump crude oil through the meter 10 so long as a sufficient supply of oil is present in the surge tank for providing an efficient operation of the meter.

When it is desired to test or prove the meter 10, the pump 16 is first stopped to discontinue a discharge of oil from the surge tank 4. If the pump 16 is not already stopped, it may be stopped by turning the control knob 64 to the position B. In this position of the control knob 64, the switch 56 is opened, but the switch 36 will still be closed to retain the control valve 30 open. Continued operation of the pump 16 will drain the surge tank 4 until the lower float 21 is actuated to close the lower float switch 24. When this occurs, the pump 16 stops. However, since the control valve 30 is open, the tank 4 and flume 18 will again begin to fill. As the oil level passes the central float 22, the switch 26 will be closed. However, since the switch 56 is open, the circuit 42 will not be closed and the pump 16 will not be energized. When the oil level reaches the upper float 23, the upper float switch 28 will be opened to close the control valve 30 and prevent a further supply of oil to the surge tank. At this time, the operator actuates the adjusting screw 92 to lower the lower end of the pointer 84 into contact with the upper surface of the oil standing in the upper gauge glass 66. The indicating hand 98 will then show the precise height of the oil in the surge tank 4 and the flume 18 on the scale 96. The operator also obtains the temperature of the oil in the surge tank 4 by use of the usual cup case thermometer in accordance with API procedures.

The control knob 64 is then turned to the C position to open the switch 36 and close the switch 56. When this occurs, the relay coil 54 will be energized to close the switch 48 and energize the pump 16 to pump oil from the surge tank 4 through the meter 10. As the oil level lowers the upper float 23, the upper float switch 28 will be closed. However, since the switch 36 is open, the control valve 30 will remain closed and prevent a supply of oil to the surge tank 4. As the oil level passes below the central float 22, the central float switch 26 will be opened, however the relay 50 will stay in its left-hand position and the switch 48 will remain closed to provide a continued operation of the pump 16. When the oil level reaches the lower float 21 the pump 16 will be de-energized, as previously described, to prevent a further discharge of oil from the surge tank through the meter 10.

The precise level of the oil in the surge tank 4 and the flume 18 is then determined by use of the liquid level pointer 84 and indicating hand 98 associated with the lower gauge glass 66. Also, the operator again measures the temperature of the oil in the surge tank 4. A tank table for the surge tank 4 will normally be available, or can be obtained by strapping the tank in a manner well known in the art, such that the volume between any two levels in the tank may be easily found. Also, a tank table may be obtained for the flume 18. The volume displaced from the tank 4 is, of course, added to the volume displaced from the flume 18 to obtain the total volume pumped through the meter 10. Also, this total volume may be corrected for the difference between the temperature of the oil removed from the tank and flume and the base temperature to which the meter 10 is compensated. These results may be easily compared with the indicator or run ticket of the meter 10 to determine the accuracy of the meter 10 within very precise limits. After the meter 10 has been proven, the control knob 64 is turned back to the A position for closing both of the switches 36 and 56 and continuing the normal operation of the system.

The new meter factor, determined by dividing the volume of oil measured as being removed from the surge tank 4 and flume 18 by the volume recorded by the meter, is used on subsequent run tickets of the meter until the meter is again proved.

From the foregoing it will be apparent that the present invention provides a means for simply and efficiently converting an existing meter type custody transfer system to such a system wherein the meter may be periodically proven or tested for accuracy. The meter may be tested without the necessity of transporting special equipment to the meter location. The complete operation of the system may be performed by operating personnel normally present on the job simply and efficiently in a minimum of time and with a minimum of expense. The present system is simple in construction, will have a long service life and may be economically manufactured.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. In a system for transferring custody of crude oil or the like from a supply line to a receiving pipe line, including a surge tank communicating with the supply line, a meter connected between the surge tank and the receiving pipe line, and an electrically driven pump in the connection of the meter to the surge tank for pumping oil from the surge tank through the meter; the improvement which comprises an electrically operated control valve interposed in the supply line, three vertically spaced floats communicating with the interior of the tank, a switch operatively connected to each float for opening and closing with movement of the respective float, a first electric circuit connecting the upper float switch to the control valve, a second electric circuit connecting the lower two float switches to the pump, and manual control means for selectively closing and interrupting the circuits to provide a cycle wherein the pump forces a quantity of oil through the meter equal to the volume of oil in the surge tank between the levels of the upper and lower floats for proving the meter, and, alternately, a cycle wherein the control valve is open and oil is pumped continuously from the surge tank through the meter, as long as a sufficient quantity of oil is present in the surge tank.

2. The improvement defined in claim 1 wherein said second circuit includes a double acting relay connected to the pump and having two energizing coils, conductors connecting one of said coils to the lowest float switch, and conductors connecting the other of said coils to the centrally located float switch to open and close said relay by operation of said lower two float switches.

References Cited in the file of this patent

UNITED STATES PATENTS

| 1,150,600 | Jay | Aug. 17, 1915 |
| 1,346,898 | Kingsbury | July 20, 1920 |
| 2,118,311 | Kinderman | May 24, 1938 |
| 2,160,062 | Drake et al. | May 30, 1939 |
| 2,385,161 | Pinkerton | Sept. 18, 1945 |
| 2,817,967 | Meyers | Dec. 31, 1957 |

OTHER REFERENCES

"Water Meter Testing on a Mass Production Basis," Engineering News-Record, page 109, September 10, 1942. (Copy of article in Class 73, subclass 3.)

McKinley: "P. D. Meters Get the Job Done," Oil and Gas Journal, October 1, 1956, pages 87–92. (Class 73–3.) (Copies of the Oil and Gas Journal can be found in the Scientific Library. Copies of the article cited are in Division 36.)

"Where Do We Stand Today on Automatic Custody Transfer?," Oil and Gas Journal (June 11, 1956), vol. 54, No. 58, pp. 101–114, Class 73–224.